United States Patent
Al-Mousa et al.

(10) Patent No.: US 11,506,011 B2
(45) Date of Patent: Nov. 22, 2022

(54) METHOD AND APPARATUS OF SMART JARRING SYSTEM

(71) Applicant: SAUDI ARABIAN OIL COMPANY, Dhahran (SA)

(72) Inventors: Ahmed Abdulaziz Al-Mousa, Doha (SA); Mohammed Ahmed Alkhowaildi, Safwa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 24 days.

(21) Appl. No.: 17/124,937

(22) Filed: Dec. 17, 2020

(65) Prior Publication Data
US 2022/0195865 A1 Jun. 23, 2022

(51) Int. Cl.
*E21B 31/107* (2006.01)
*E21B 31/113* (2006.01)
*E21B 47/07* (2012.01)
*G01V 8/12* (2006.01)

(52) U.S. Cl.
CPC ......... *E21B 31/107* (2013.01); *E21B 31/113* (2013.01); *E21B 47/07* (2020.05); *G01V 8/12* (2013.01)

(58) Field of Classification Search
CPC ...... E21B 47/07; E21B 31/113; E21B 31/107; E21B 31/1075; E21B 31/1135; G01V 8/12
See application file for complete search history.

(56) References Cited

U.S. PATENT DOCUMENTS

| | | | |
|---|---|---|---|
| 3,566,981 | A | 3/1971 | Love |
| 3,987,858 | A | 10/1976 | Slator et al. |
| 4,376,468 | A | 3/1983 | Clark |
| 4,462,471 | A | 7/1984 | Hipp |
| 6,991,035 | B2 | 1/2006 | Hall et al. |
| 7,533,724 | B2 * | 5/2009 | McLaughlin ......... E21B 31/107 166/301 |

(Continued)

FOREIGN PATENT DOCUMENTS

| | | |
|---|---|---|
| AU | 2012268851 B2 | 8/2015 |
| CN | 111684141 A | 9/2020 |

(Continued)

OTHER PUBLICATIONS

International Search Report and Written Opinion issued in Application No. PCT/US2021/064093, dated Mar. 3, 2022 (14 pages).

*Primary Examiner* — Michael R Wills, III
(74) *Attorney, Agent, or Firm* — Osha Bergman Watanabe & Burton LLP

(57) ABSTRACT

A smart jarring system for freeing stuck equipment downhole is disclosed. The smart jarring system comprises a set of jars, at least one laser source and at least one laser receiver that corresponds to the at least one laser source. The laser receiver intercepts a laser beam that is emitted from the laser source. This interception helps determine when the set of jars fired and in which direction the set of jars fired. The smart jarring system further comprises one or more sensors selected from the group consisting of vibration sensors, temperature sensors, and torque/tensile sensors. These sensors are configured to diagnose downhole conditions and help free the stuck equipment downhole.

17 Claims, 7 Drawing Sheets

(56) References Cited

U.S. PATENT DOCUMENTS

| | | | |
|---|---|---|---|
| 8,499,836 B2* | 8/2013 | Moriarty | E21B 31/107 166/301 |
| 8,789,598 B1* | 7/2014 | Mlcak | E21B 31/107 166/301 |
| 9,631,446 B2 | 4/2017 | Hradecky | |
| 10,190,394 B2* | 1/2019 | Guo | E21B 47/07 |
| 10,280,700 B2* | 5/2019 | Moyes | E21B 31/113 |
| 10,294,745 B2* | 5/2019 | Strachan | E21B 31/1135 |
| 10,480,270 B2* | 11/2019 | Massey | E21B 31/1135 |
| 10,655,415 B2* | 5/2020 | Castillo | E21B 31/1135 |
| 2011/0083845 A1 | 4/2011 | McLaughlin | |
| 2016/0356111 A1 | 12/2016 | Castillo et al. | |

FOREIGN PATENT DOCUMENTS

| | | | | |
|---|---|---|---|---|
| EP | 3461989 B1 | 5/2020 | | |
| WO | 2015160365 A1 | 10/2015 | | |
| WO | WO-2019164404 A1 * | 8/2019 | | E21B 31/005 |

* cited by examiner

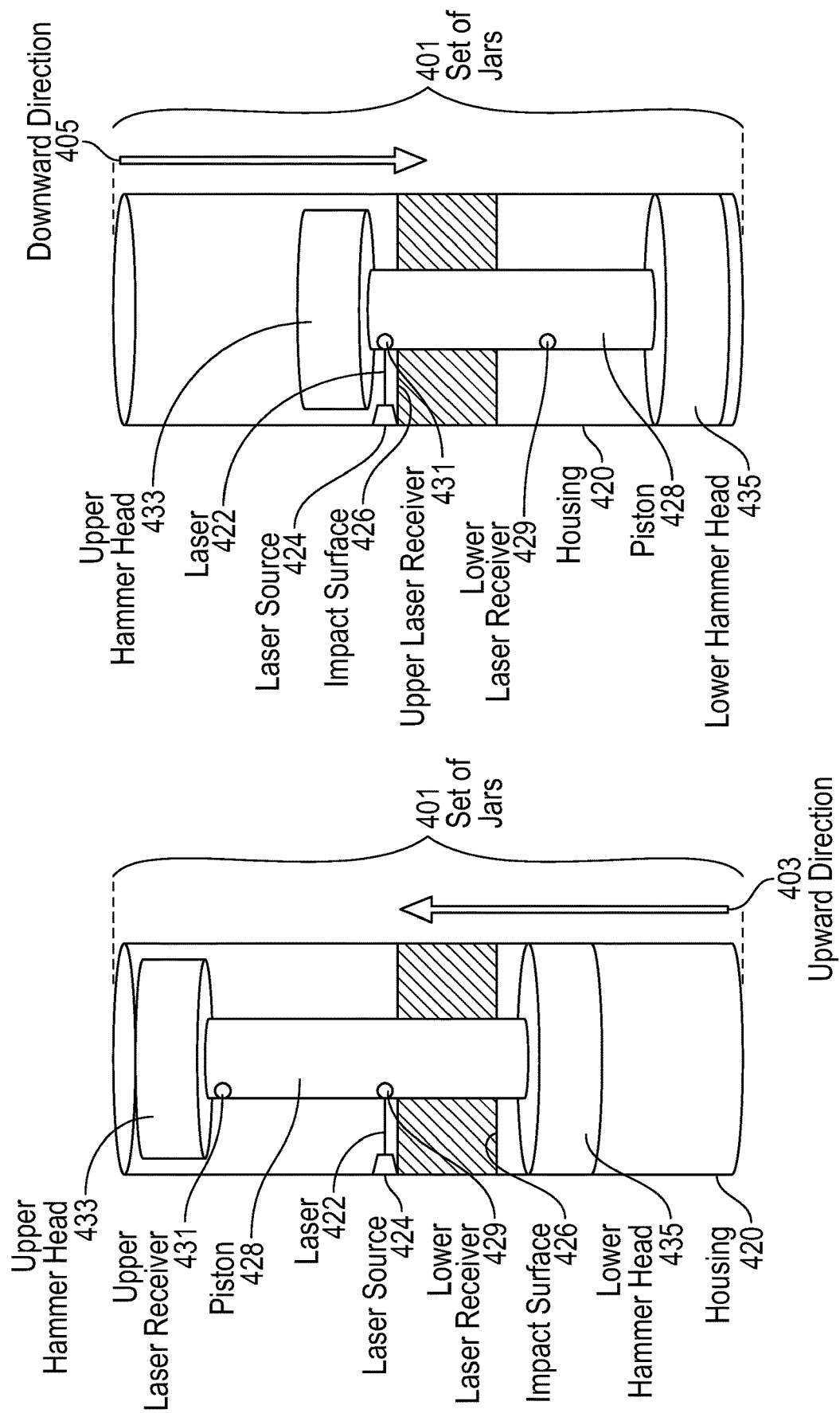

METHOD AND APPARATUS OF SMART JARRING SYSTEM

BACKGROUND

Hydrocarbon fluids are often found in hydrocarbon reservoirs located in porous rock formations below the earth's surface. Hydrocarbon wells may be drilled to extract the hydrocarbon fluids from the hydrocarbon reservoirs. Hydrocarbon wells may be drilled by running a drill string, comprised of a drill bit and a bottom hole assembly, into a wellbore to break the rock and extend the depth of the wellbore. A fluid may be pumped through the drill bit to help cool and lubricate the drill bit, provide bottom hole pressure, and carry cuttings to the surface. In drilling operations, the drill string may become stuck. A stuck drill string occurs when the drill string cannot be moved up or down the wellbore without excessive force being applied. Often, a set of jars are run above, below, or within the bottom hole assembly to help the drill string become free in stuck pipe scenarios. Jars may also be run during workover and completions operations to help free stuck work string or stuck production string.

Jars are mechanical devices that may deliver an impact load to another device, such as the bottom hole assembly. The action of jars delivering the impact load is called "jarring" or "firing." Jars are mechanically or hydraulically operated, and may be designed to fire upwards, downwards, or in both directions. When jars fire in one direction they are called single action jars. When jars fire in either or both directions, they are called dual action jars.

Stuck pipe scenarios may be costly and detrimental to an operation if the pipe is unable to become freed. Jars offer a presumptive solution that may be applied immediately after the stuck pipe scenario is encountered. However, conventional jarring systems do not provide real time data with downhole conditions, and it is difficult to determine if the jars have activated. Consequently, a jarring system that may provide real time feedback about downhole conditions, and a jarring system that may deliver jarring results is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a smart jarring system and a method to operate the system. In general, in one or more embodiments, the smart jarring system comprises a set of jars, at least one laser source and at least one laser receiver that corresponds to the at least one laser source. The laser receiver intercepts a laser beam that is emitted from the laser source. This interception helps determine when the set of jars fired and in which direction the set of jars fired. In some embodiments, the smart jarring system further comprises one or more sensors selected from the group consisting of vibration sensors, temperature sensors, and torque/tensile sensors. These sensors are configured to diagnose downhole conditions. In further embodiments, the set of jars may be mechanically operated jars or the set of jars may be hydraulically operated jars, and the set of jars may be single action or dual action jars.

In one or more embodiments, a method for operating the smart jarring system comprises installing a set of jars in a bottom hole assembly, wherein the set of jars comprises at least one laser source and at least one corresponding laser receiver. When a jarring operation is initiated to free stuck equipment downhole, the laser receiver receives a laser beam emitted from the laser source to deliver, in real-time, jarring data to a computer processor, wherein the jarring data comprises an amount of time passed between initiation of the jarring operation and reception of the laser beam at the laser receiver. From the jarring data, whether the set of jars have fired, which direction the set of jars have fired, and corrective steps for freeing the stuck equipment is determined.

The corrective steps to free the stuck equipment further comprise: repeating the jarring operation, jarring in a different direction, cutting the stuck equipment at a free point, and running fishing tools. In some embodiments, the smart jarring system further comprises one or more sensors selected from the group consisting of vibration sensors, temperature sensors, and torque/tensile sensors. These sensors are configured to diagnose downhole conditions. In further embodiments, the set of jars may be mechanically operated jars or the set of jars may be hydraulically operated jars, and the set of jars may be single action or dual action jars.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 4A-4B show an apparatus in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Jarring systems are used in downhole applications to release energy to downhole components and free stuck objects. For example, during drilling operations, jarring equipment may be run in tandem with a bottom hole assembly (BHA) to provide a tool to help a drill string become free when a stuck pipe scenario occurs. Knowledge of downhole conditions and jarring results is crucial when utilizing jarring equipment to free stuck equipment. To this end, embodiments disclosed herein relate to a smart jarring system for downhole deployment that is able to provide real time feedback about downhole conditions and jarring results.

Figure 1:
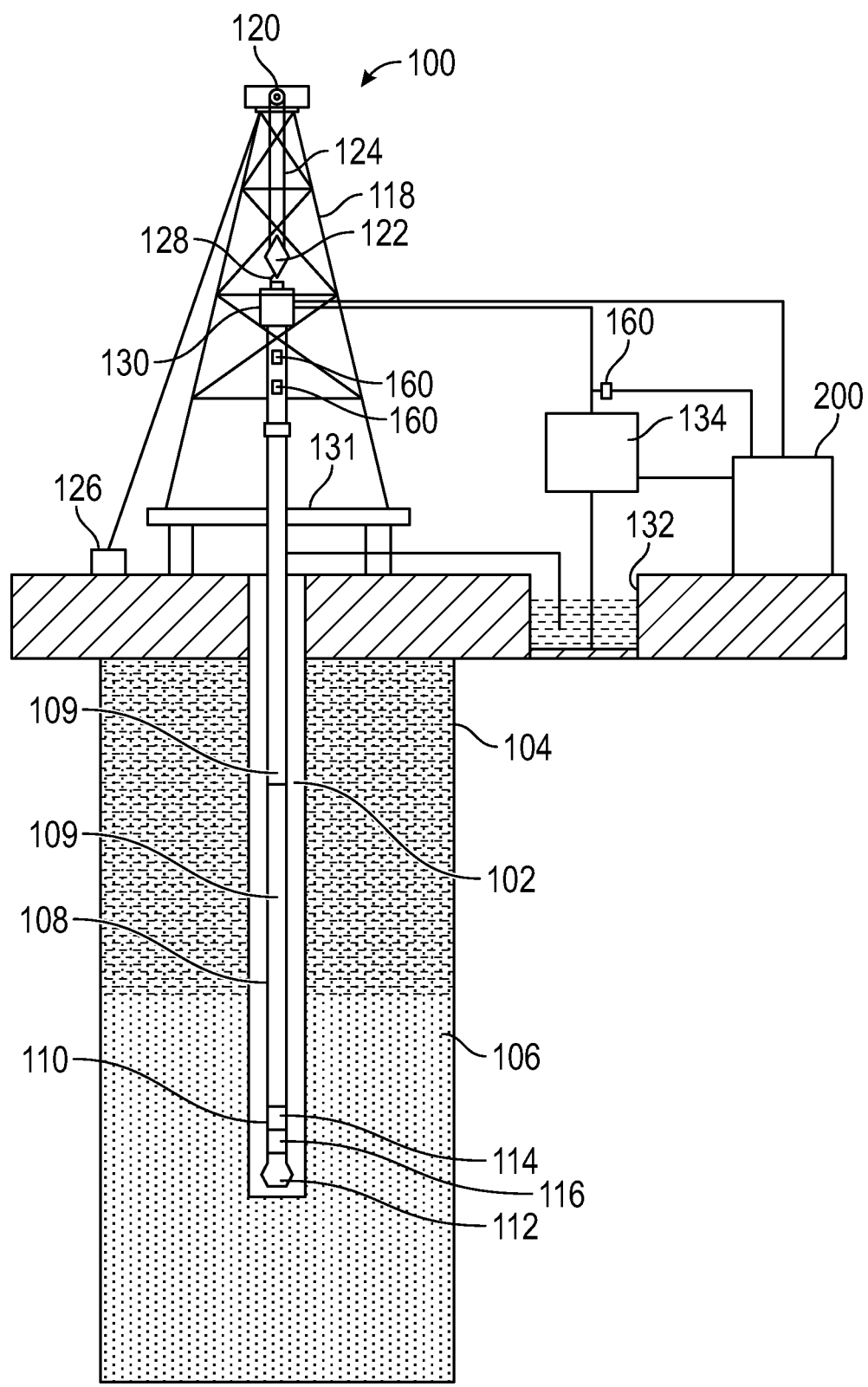
FIG. 1 shows an exemplary well site in accordance with one or more embodiments.

FIG. 1 illustrates an exemplary well site (100). In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported. The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (200) may be disposed at or communicate with the well site (100). System (200) may control at least a portion of a drilling operation at the well site (100) by providing controls to various components of the drilling operation. In one or more embodiments, system (200) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation). Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108). The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (200).

FIGS. 2A-4B depict different embodiments of smart jarring systems comprised of conventional jarring systems and lasers. The jarring systems disclosed herein may be deployed in a wellbore (102) for any downhole operation that utilizes tools with the potential for sticking. The disclosed smart jarring systems may be hydraulically or mechanically operated. Hydraulically and/or mechanically operated jars may have different designs but operate similarly by transforming stored potential energy into an impact force. The impact force is designed to "jar" the stuck component of the downhole tool to become free. The jarring systems may jar in an upward, downward, or dual direction. The jarring systems may be installed above, below, or within a bottom hole assembly (110).

Figure 2B:
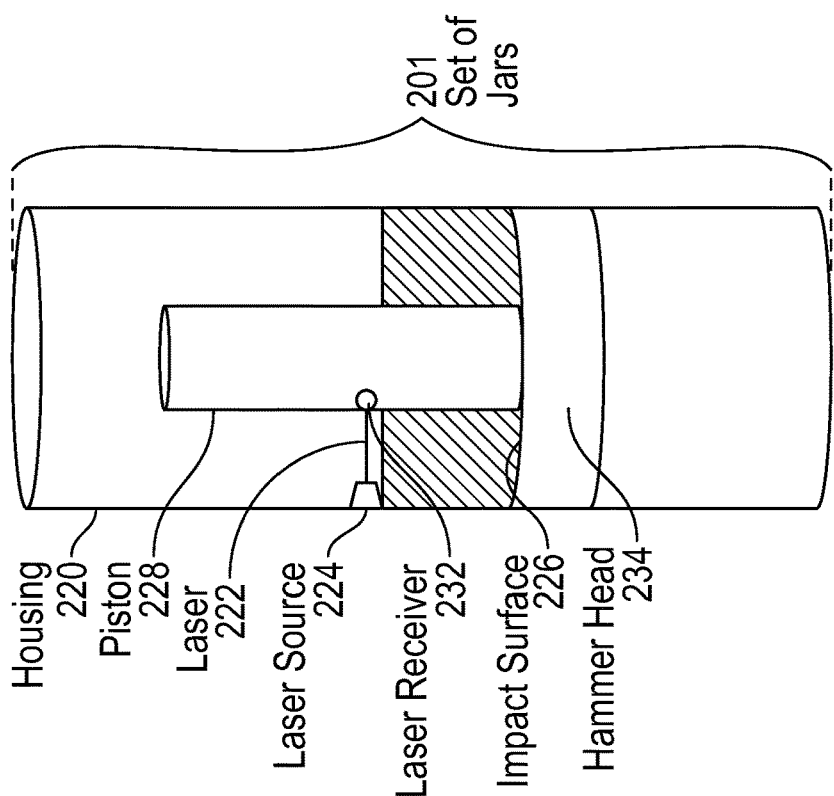
FIGS. 2A-2B show an apparatus in accordance with one or more embodiments.
Figure 2A:
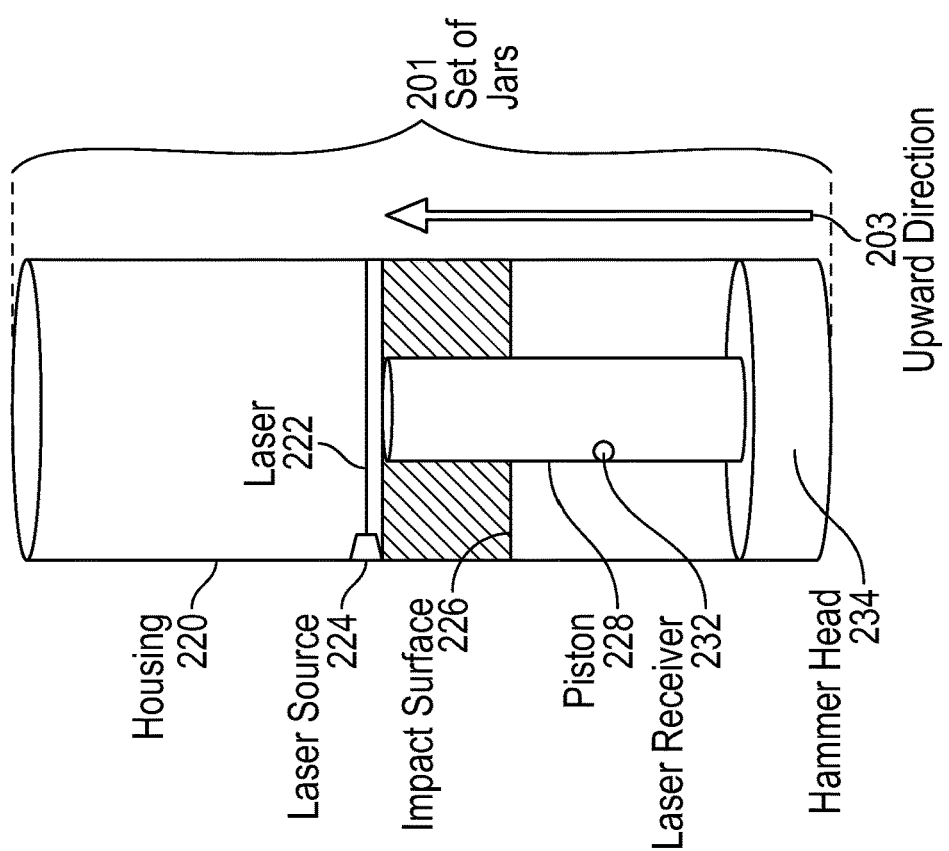

FIGS. 2A and 2B depict, in accordance with one or more embodiments, a smart single action upward (203) jarring system comprising a set of jars (201) that are designed to jar in the upwards direction (203). Herein, the set of jars (201) is the conventional jarring system comprising a housing (220), a piston (228), and at least one hammer head (234). The upwards direction (203) herein refers to the movement of the piston (228) and at least one hammer head (234) from the direction of the drill bit (112) to the direction of the top drive (130) with reference to the drill bit (112) being positioned in the wellbore (102) and the top drive (130) being positioned in the derrick (118). FIG. 2A, in particular, depicts the position of the set of jars (201) prior to initiation, and FIG. 2B depicts the position of the set of jars (201) after initiation while applying the impact load.

The housing (220) is a container that houses the piston (228) and the hammer head (234). As shown in FIGS. 2A and 2B, the housing (220) is a cylindrical tube made of any material, such as steel, that can withstand the high pressures, temperatures, and forces experienced during the operation. The inner diameter and outer diameter of the housing (220) may be consistent throughout, as show in in FIGS. 2A and 2B, or the inner diameter and outer diameter may change across the housing (220). The housing (220) has an impact surface (226) which provides a surface for the hammer head (234), delivered by the piston (228), to make contact with and release stored energy. The impact surface (226) is a solid cylinder made of any rigid material, such as steel, that can withstand, and also transmit to the rest of the downhole equipment, the expected impact force applied by the hammer head (234). In the case of FIGS. 2A and 2B, the impact between the hammer head (234) and the impact surface (226) may create an impact load in the upwards direction (203).

In one or more embodiments, a laser source (224) that emits a laser beam (222) may be installed along the housing (220) as shown in FIGS. 2A and 2B. The laser beam (222) emitted by the laser source (224) is received by a corresponding laser receiver (232). More specifically, the laser receiver (232) is configured to intercept the laser beam (222) emitted by the laser source (224). For example, there are four types of laser sources (224) that may be used herein: a solid-state laser, a gas laser, a liquid laser, and a semiconductor laser. These laser sources (224) differ by the medium and energy source used to produce the laser beam (222). For example, the solid state laser source (224) uses a solid object as a laser medium, such as a ruby crystal, and uses light energy as the energy source. The gas laser source (224) generates a laser beam (222) by discharging an electric current through a gas, such as an argon gas. The liquid laser source (224) uses light energy passed through a liquid medium, such as an organic dye solution. The semi-conductor laser source (224) used a solid object as a laser medium, such as a ruby crystal, and uses an electric current as the energy source. Those skilled in the art will appreciate that the laser sources noted above may be used alone or in combination, and that embodiments disclosed herein are not limited to the types of laser sources mentioned above. Any suitable type of laser source may be used to emit/transmit a laser beam.

Furthermore, there may be four types of laser receivers (232) that may be used with respect to embodiments disclosed herein: a charge-coupled device (CCD), a complementary metal oxide semiconductor (CMOS), a position-sensitive detector (PSD), and a photoelectric sensor. The CCD laser receiver (232) contains cells that convert the laser beam (222) into electrons. These electrons cross a chip that may interpret the data. The CMOS laser receiver (232) also contains cells that convert the laser beam (222) into electrons, but the CMOS laser receiver (232) is constructed so that data from each cell can be obtained individually without the need to transfer energy over a chip. The PSD laser receiver (232) can locate a laser beam (222) in one or two dimensions and functions by triangulated signal reception. The photoelectric laser receiver (232) is designed to detect the absence or the presence of an object by the disruption in the laser beam (222). When the laser beam (222) is disrupted, the photoelectric laser receiver (232) relays a signal and a specific function is performed. Those skilled in the art will appreciate that the laser receivers noted above may be used alone or in combination, and that embodiments disclosed herein are not limited to the types of laser receivers mentioned above. Any suitable type of laser receiver may be used to receive a laser beam.

The laser receiver (232) may be installed on the piston (228) so when the hammer head (234) makes contact with the impact surface (226), the laser receiver (232) is in line with (i.e., in the same plane as) the laser source (224) and laser beam (222) as shown in FIG. 2B. When the laser receiver (232) intercepts the laser beam (224), a signal may be relayed to a computer processor at the surface with a positive indication that the hammer head (234) has contacted the impact surface (226), indicating that the set of jars (201) have fired. The signal may be delivered using wired pipe.

Figure 3B:
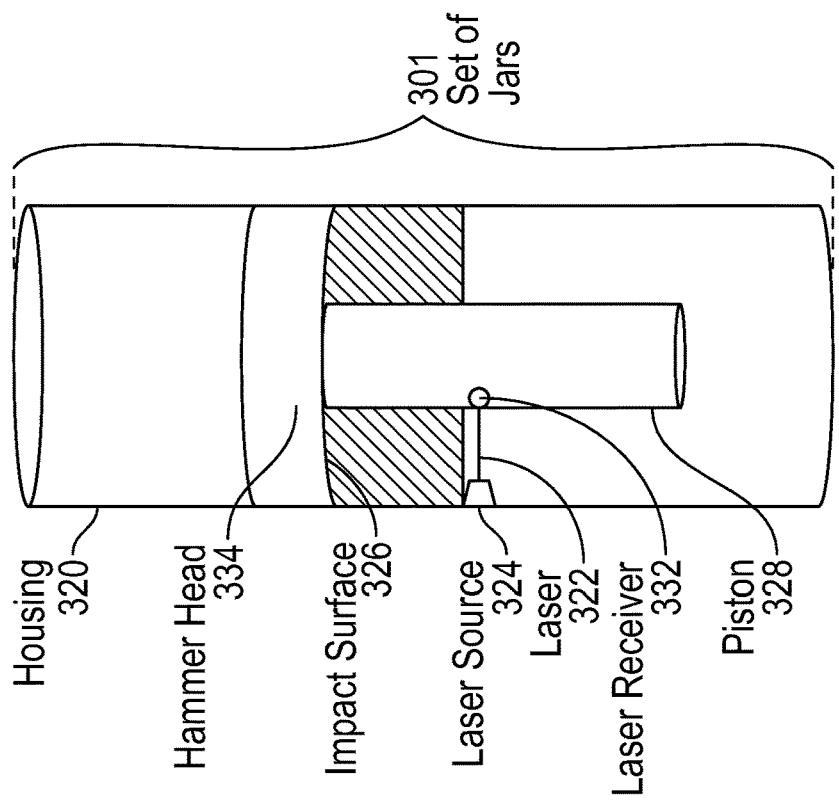
FIGS. 3A-3B show an apparatus in accordance with one or more embodiments.
Figure 3A:
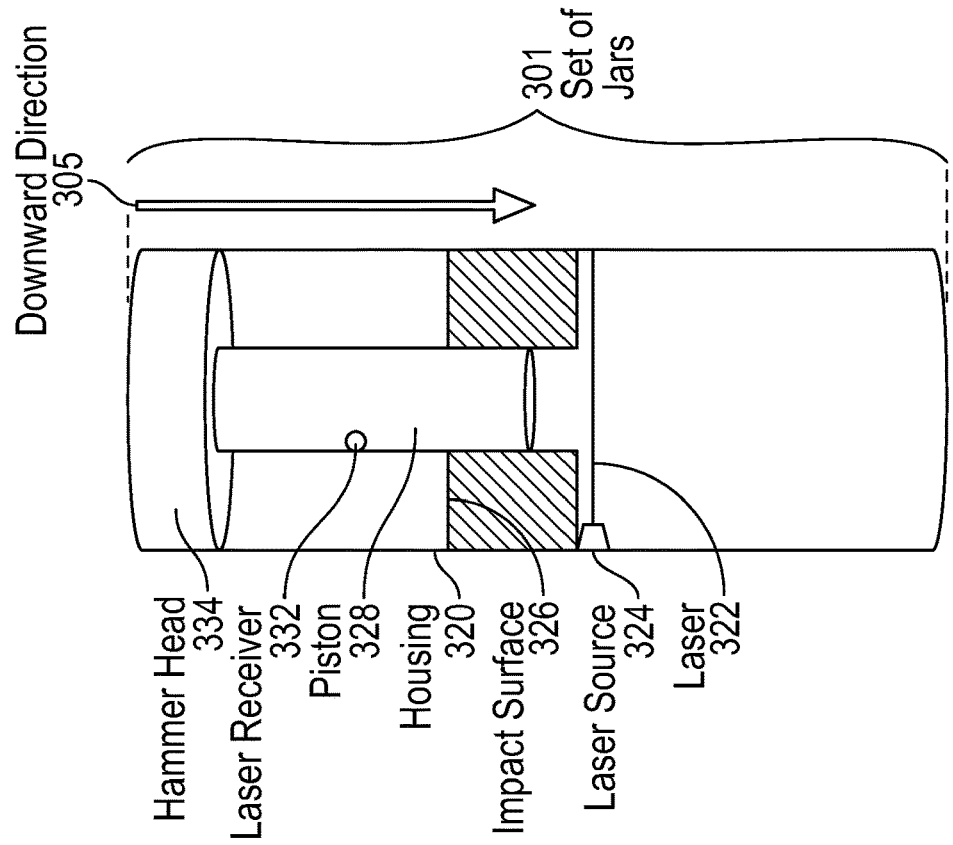

FIGS. 3A and 3B depict, in accordance with one or more embodiments, a smart single action downward (305) jarring system including a set of jars (301) that are designed to jar in a downwards direction (305). The downwards direction (305) herein refers to the movement of the piston (328) and at least one hammer head (334) from the direction of the top drive (130) to the direction of the drill bit (112) with reference to the drill bit (112) being positioned in the wellbore (102) and the top drive (130) being positioned in the derrick (118). FIG. 3A, in particular, depicts the position of the set of jars (301) prior to initiation, and FIG. 3B depicts the position of the set of jars (301) after initiation while applying an impact load. Similar to FIGS. 2A and 2B, the set of jars (301) are comprised of a housing (320), a piston (328), and a hammer head (334).

The housing (320) is a container that houses the piston (328) and the hammer head (334). As shown in FIGS. 3A and 3B, the housing (320) is a cylindrical tube made of any material, such as steel, that can withstand the high pressures, temperatures, and forces experienced during the operation. The inner diameter and outer diameter of the housing (320) may be consistent throughout, as show in in FIGS. 3A and 3B, or the inner diameter and outer diameter may change across the housing (320). The housing (320) has an impact surface (326) which provides a surface for the hammer head (334), delivered by the piston (328), to make contact with and release stored energy. The impact surface (326) is a solid cylinder made of any rigid material, such as steel, that can withstand, and also transmit to the rest of the downhole equipment, the expected impact force applied by the hammer head (334). In the case of FIGS. 3A and 3B, the impact between the hammer head (334) and the impact surface (326) may create an impact load in the downwards direction (305).

A laser source (324) that emits a laser beam (322) is installed along the housing (320) as shown in FIGS. 3A and 3B. The laser beam (322) is designed to interact with a corresponding laser receiver (332) when the laser receiver (332) intercepts the laser beam (322). The laser receiver (332) is installed on the piston (328) so when the hammer head (334) makes contact with the impact surface (326), the laser receiver (332) is in line with the laser source (324) and laser beam (322) as shown in FIG. 3B. Therefore, when the laser receiver (332) intercepts the laser beam (324), a signal may be relayed to a computer processor, at the surface, with a positive indication that the hammer head (334) has contacted the impact surface (326), or, that the set of jars (301) have fired. The signal may be delivered using wired pipe.

FIGS. 4A and 4B depict, in accordance with one or more embodiments, a smart dual action jarring system comprising a set of jars (401) that are designed to jar in both the downwards (405) and the upwards direction (403). Specifically, FIG. 4A depicts the position of the set of jars (401) while jarring in the upward direction (403), and FIG. 4B depicts the position of the set of jars (401) while jarring in the downwards direction (405). Furthermore, the set of jars (401) are comprised of a housing (420), a piston (428), an upper hammer head (433), and a lower hammer head (435).

The housing (420) is a container that houses the piston (428) and the hammer heads (433, 435). As shown in FIGS. 4A and 4B, the housing (420) is a cylindrical tube made of any material, such as steel, that can withstand the high pressures, temperatures, and forces experienced during the operation. The inner diameter and outer diameter of the housing (420) may be consistent throughout, as show in in FIGS. 4A and 4B, or the inner diameter and outer diameter may change across the housing (420). The housing (420) has an impact surface (426) which provides a surface for the hammer heads (433, 435), delivered by the piston (428), to make contact with and release stored energy. The impact surface (426) is a solid cylinder made of any rigid material, such as steel, that can withstand, and also transmit to the rest of the downhole equipment, the expected impact force applied by the hammer heads (433, 435). As shown in FIG. 4A, the impact between the lower hammer head (435) and the impact surface (426) may create an impact load in the upwards direction (403). As shown in FIG. 4B, the impact between the upper hammer head (433) and the impact surface (426) may create an impact load in the downwards direction (405).

A laser source (424) that emits a laser beam (422) is installed along the housing (420) as shown in FIGS. 4A and 4B. The laser beam (422) is designed to interact with one or more laser receivers (431, 429) when the laser receivers (431, 429) intercept the laser beam (422). FIGS. 4A and 4B depict two distinct laser receivers, an upper laser receiver (431) and a lower laser receiver (429). The upper laser receiver (431) corresponds with the upper hammer head (433) and the lower laser receiver (429) corresponds with the lower hammer head (435). The lower laser receiver (429) is installed on the piston (428) near the lower hammer head (435) so when the lower hammer head (435) makes contact with the impact surface (426), the lower laser receiver (429) is in line with the laser source (424) and laser beam (422) as shown in FIG. 4A. Therefore, when the lower laser receiver (429) intercepts the laser beam (424), a signal may be relayed to a computer processor, at the surface, with a positive indication that the lower hammer head (435) contacted the impact surface (426), or that the set of jars (401) have fired in the upward direction (403). The signal may be delivered using wired pipe.

The upper laser receiver (431) is installed on the piston (428) near the upper hammer head (433) so when the upper hammer head (433) makes contact with the impact surface (426), the upper laser receiver (431) is in line with the laser source (424) and laser beam (422) as shown in FIG. 4B. Therefore, when the upper laser receiver (431) intercepts the laser beam (424), a signal may be relayed to a computer processor, at the surface, with a positive indication that the upper hammer head (433) has contacted the impact surface (426), or that the set of jars (401) have fired in the downward direction (405). The signal may be delivered using wired pipe. Those skilled in the art will appreciate that although embodiments disclosed herein describe specific installation locations of laser sources and receivers, the laser sources and receivers may be installed in any location where positive indication of jarring may be recorded, without departing from the scope of this disclosure.

Figure 5:
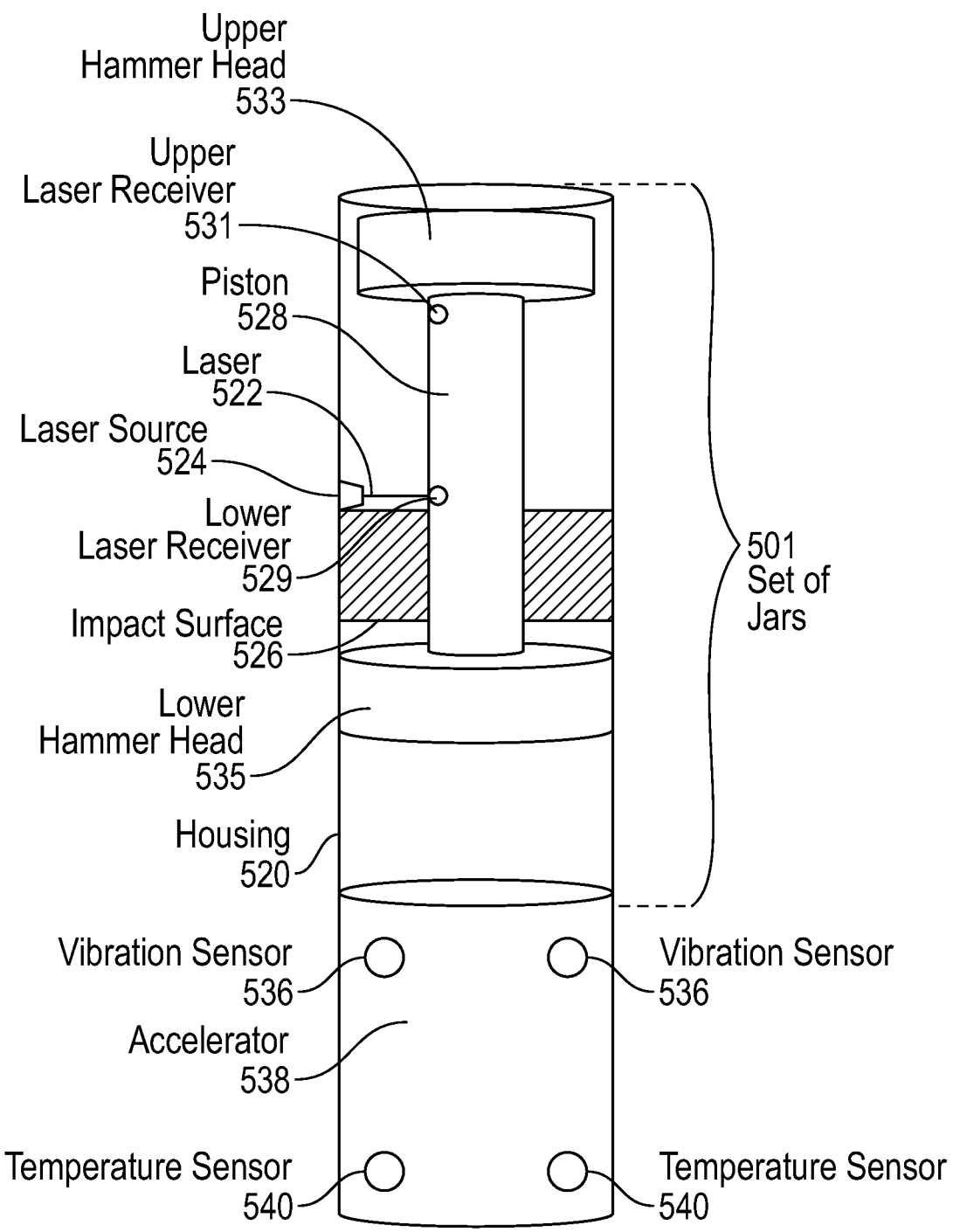
FIG. 5 shows an apparatus in accordance with one or more embodiments.

FIG. 5 depicts, in accordance with one or more embodiments, a smart dual action jarring system comprised of a set of jars (501) and a laser configuration in tandem with an accelerator (538). The set of jars (501) and laser configuration comprise an upper hammer head (533), upper laser receiver (531), piston (528), laser beam (522), laser source (524), lower laser receiver (529), impact surface (526), lower hammer head (535), and housing (520). The accelerator (538) may be comprised of a plurality of sensors. The accelerator (538) may optimize the jarring operation by maximizing the impact force applied by the set of jars (501). The accelerator (538) may maximize the impact force by increasing the velocity of the mass being applied to the set of jars (501).

In FIG. 5, the sensors are vibration sensors (536) and temperature sensors (540). The vibration sensors (536) may be installed at a plurality of locations around the set of jars (501) to understand and determine how the impact force, applied by the set of jars (501), is distributed throughout the downhole equipment. More specifically, the vibration sensors (536) may convey the specific locations along the downhole equipment that are receiving the impact force produced by the jarring operation. The temperature sensors (540) may allow real-time monitoring of the downhole equipment's temperature. High temperatures, due to friction created by the jarring operation, may cause mechanical damage in the downhole equipment. Knowledge of the equipment's temperature may prevent twist offs or other mechanical failures caused by high temperatures. The vibration sensors (536) and the temperature sensors (540) provide an opportunity to make data driven decisions effecting how to proceed with the jarring operation if a stuck or tight pipe scenario is encountered.

Figure 6:
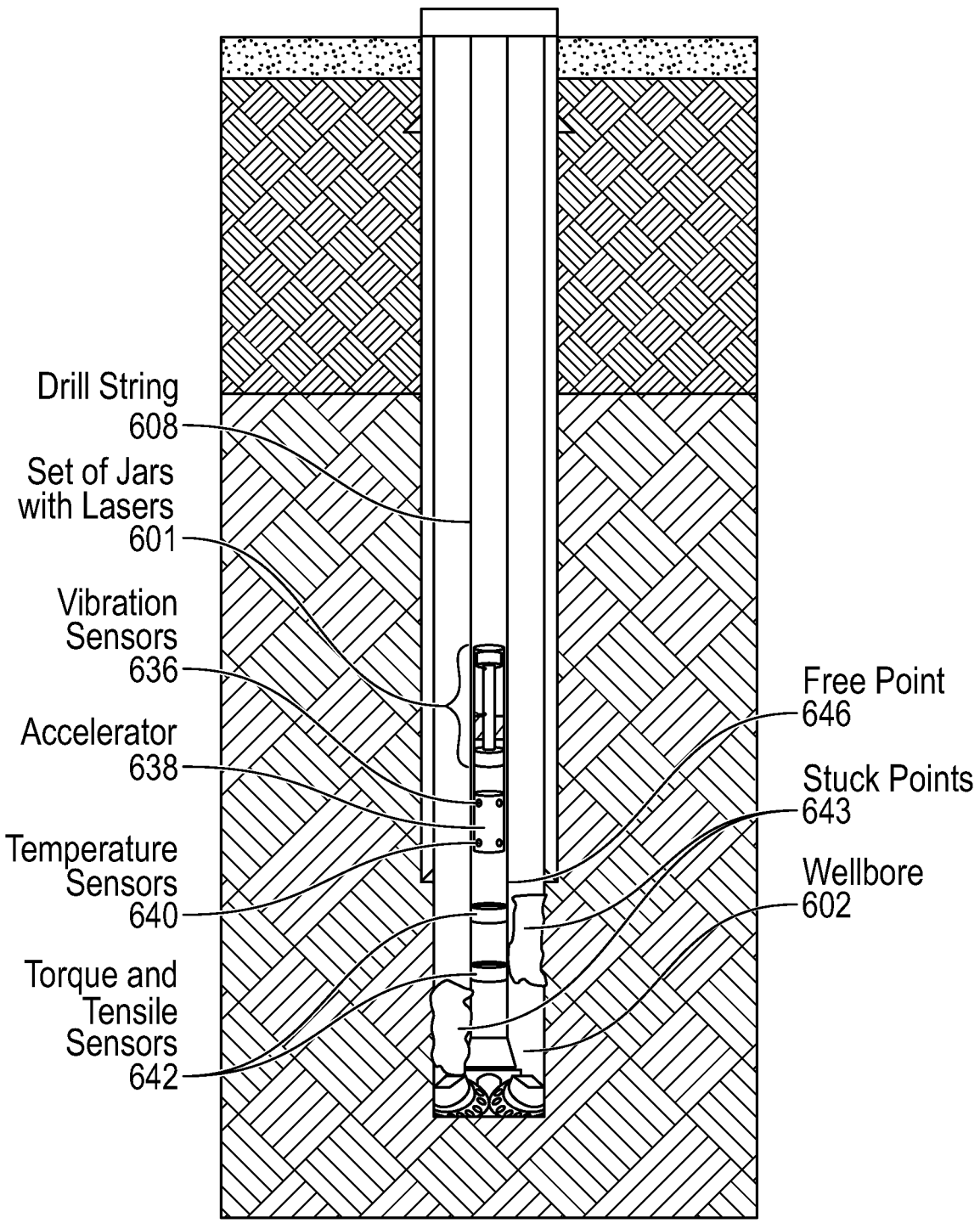
FIG. 6 shows an apparatus deployed in a drill string bottom hole assembly in accordance with one or more embodiments.

FIG. 6 depicts, in accordance with one or more embodiments, the set of jars and laser configuration (601), from FIGS. 4A-4B, deployed in a drill string (608). The set of jars and laser configuration (601) are run in tandem with the accelerator (638), vibration sensors (636), temperature sensors (640), and torque/tensile sensors (642). The torque/tensile sensors (642) may be installed at a plurality of locations within the drill string (608) to measure the torque and tensile forces being applied to the downhole equipment. The knowledge of force distributions may determine stuck points (643). Stuck points (643) are the specific segments of the downhole equipment that are stuck in the wellbore (602). Knowledge of stuck points (643) provides the opportunity to focus jarring operations or fishing tools at the stuck point (643) locations to optimize freeing the stuck equipment. Furthermore, knowledge of force distributions may help locate a free point (646). The free point (646) is the point directly above the shallowest stuck point (643). Knowledge of the free point (646) provides a location where the downhole equipment may be cut off and salvaged if jarring and fishing operations fail.

Figure 7:
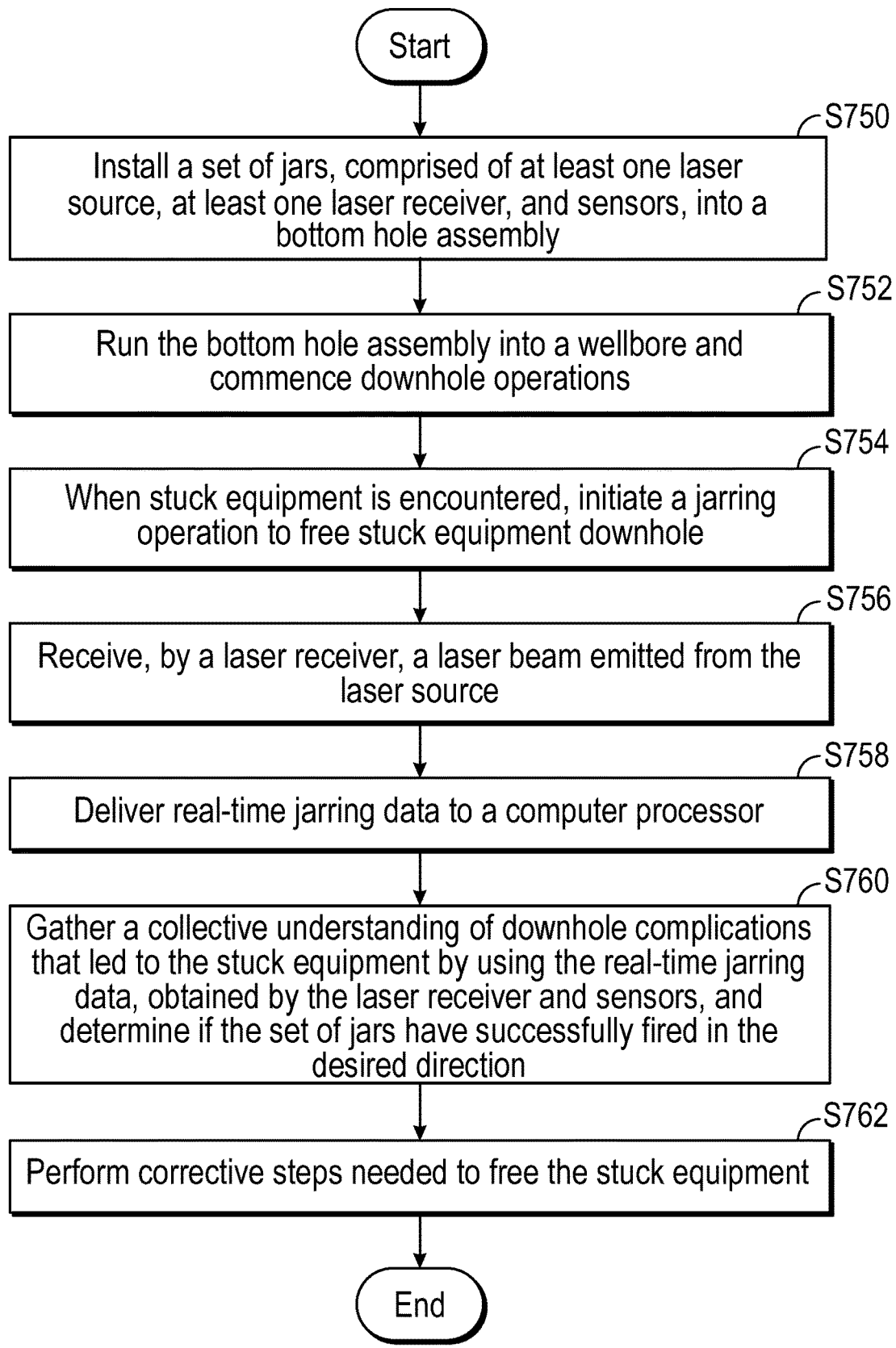
FIG. 7 shows a flowchart in accordance with one or more embodiments.

FIG. 7 depicts, in accordance with one or more embodiments, a flowchart for utilizing a smart jarring system to free stuck equipment downhole. Prior to commencing a downhole operation, a set of jars (201, 301, 401, 501, 601), comprised of at least one laser source (224, 324, 424, 524) and at least one laser receiver (232, 332, 431, 531, 429, 529), are installed above, below, or within a bottom hole assembly (110) (Step 750). The set of jars (201, 301, 401, 501, 601) may be single or dual action jars, and the set of jars (201, 301, 401, 501, 601) may be hydraulically or mechanically operated jars. The set of jars (201, 301, 401, 501, 601) may be run in tandem with an accelerator (538, 638). A plurality of sensors, such as vibration sensors (536, 636), temperature sensors (540, 640), and torque/tensile sensors (642), may be installed on the downhole equipment (Step 750).

The bottom hole assembly (110) is run into a wellbore (102, 602) to commence the downhole operation (Step 752). While performing the downhole operation, the downhole equipment may become stuck or tripping may become tight and a jarring operation is initiated (Step 754). As the hammer head (234, 334, 433, 435, 533, 535) makes impact with the impact surface (226, 326, 426, 526) of the housing (220, 320, 420, 520), the laser receiver (232, 332, 431, 531, 429, 529) receives a laser beam (222, 322, 422, 522) emitted from the laser source (224, 324, 424, 524) (Step 756). Jarring data, collected in real-time, is transmitted, by wired drill pipe, to a computer processor (Step 758) with a stored algorithm at the surface. The computer processor may be part of a computer system for analyzing/processing data collected downhole. The jarring data may comprise: if the laser receiver (232, 332, 431, 531, 429, 529) received a laser beam (222, 322, 422, 522), the time at which the laser receiver (232, 332, 431, 531, 429, 529) received the laser beam (222, 322, 422, 522), and data gathered from the sensors. Gather a collective understanding of downhole complications that led to the stuck equipment by using the real-time jarring data, obtained by the laser receiver (232, 332, 431, 531, 429, 529) and sensors, and determine if the set of jars (201, 301, 401, 501, 601) have successfully fired in the desired direction (S760). The desired direction refers to the direction in which the set of jars (201, 301, 401, 501, 601) are intended to be fired by an action performed to the downhole equipment. For example, and in one or more embodiments, a set of jars (201, 301, 401, 501, 601) designed to jar in the upwards direction (203, 403) may require a driller at the surface to pull up on the drill string (108, 608). As the driller pulls up on the drill string (108, 608), the stuck points (643) of the drill string (108, 608) cause the drill string (108, 608) to stretch and store energy. When the set of jars (201, 301, 401, 501, 601) reach a predetermined amount of stored energy, the set of jars (201, 301, 401, 501, 601) should fire in the upwards direction (203, 403).

More specifically, referring to Step 760, whether or not the set of jars (201, 301, 401, 501, 601) have fired may be determined by analyzing the amount of time passed between initiating the jarring operation and reception of the laser beam (222, 322, 422, 522) at the laser receiver (232, 332, 431, 531, 429, 529). If the amount of time passed is within an acceptable range of time, then the set of jars (201, 301, 401, 501, 601) have successfully fired. The acceptable range of time may be determined from an experiment that tests the set of jars' (201, 301, 401, 501, 601) travel time under normal conditions. For example, if the set of jars (201, 301, 401, 501, 601) take 2 minutes to successfully apply an impact load at the surface, then the algorithm will analyze the amount of time passed between initiation of the jarring operation and the time the laser receiver (431, 531) intercepts the laser beam (222, 322, 422, 522). If the time is between 2 and 3 minutes, then the algorithm provides a "successful jarring" signal at the surface, but if the time is outside the 2 to 3-minute range, then the jarring operation will be repeated. The repetition of the jarring operation may be performed automatically when the time is outside of the predetermined range, or may be performed based on a command from the surface. For example, a message may be sent to the surface upon detection of the time being outside of the predetermined range, and a surface operator may repeat the jarring operation.

In embodiments where a dual action set of jars (201, 301, 401, 501, 601) are utilized, by placing two different laser receivers, an upper laser receiver (431, 531) and a lower laser receiver (429, 529), on opposite ends of the piston (228, 328, 428, 528), the direction in which the set of jars (201, 301, 401, 501, 601) have fired may be confirmed by indication of which laser receiver (431, 531, 429, 529) received the laser beam (222, 322, 422, 522) during the jarring operation.

The vibration sensors (536, 636) may provide vibrational data that may determine future corrective steps by conveying the specific locations, along the downhole equipment, that receive the impact force produced by the jarring operation. The temperature sensors (540, 640) may monitor the temperature of the downhole equipment in real time. High temperatures, due to friction produced during the jarring operation, may cause mechanical failures in the downhole equipment. Therefore, monitoring the temperature of the downhole equipment, in real time, may provide an indication if the downhole equipment may fail. If the indication is present, then preventative steps, such as stopping the jarring operation, may be taken.

Torque/tensile sensors (642) may show the torque and tensile forces applied throughout the downhole equipment. This data may provide an indication of where the stuck points (643) and the free point (646) are located. The jarring data may determine which corrective steps should be taken to free the stuck equipment. The corrective steps may comprise: repeating the jarring operation, jarring in a different direction, cutting the stuck equipment at the free point (646), or running various fishing tools. The corrective steps are performed to free the stuck equipment (Step 762).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A smart jarring system comprising:
a set of jars having a housing and a piston;
at least one laser source installed along the housing; and
at least one laser receiver installed along the piston and corresponding to the at least one laser source,
wherein the at least one laser receiver intercepts a laser beam emitted from the at least one laser source to determine when the set of jars have fired and in which direction the set of jars have fired.

2. The system of claim 1, further comprising:
one or more sensors, selected from the group consisting of vibration sensors, temperature sensors, and torque/tensile sensors, configured to diagnose downhole conditions.

3. The system of claim 1,
wherein the set of jars are mechanically operated jars.

4. The system of claim 1,
wherein the set of jars are hydraulically operated jars.

5. The system of claim 1,
wherein the set of jars are single action jars and further comprise a hammer head.

6. The system of claim 1,
wherein the set of jars are dual action jars and further comprise a lower hammer head and an upper hammer head.

7. A method of operating a smart jarring system comprising:
- installing a set of jars in a bottom hole assembly, wherein the set of jars comprises at least one laser source and at least one corresponding laser receiver;
- initiating a jarring operation to free stuck equipment downhole;
- receiving, by the at least one laser receiver, a laser beam from the at least one laser source installed within the set of jars;
- delivering, in real-time, jarring data to a computer processor, wherein the jarring data comprises an amount of time passed between initiation of the jarring operation and reception of the laser beam at the at least one laser receiver; and
- determining, from the jarring data, whether the set of jars have successfully fired, which direction the set of jars have fired, and corrective steps for freeing the stuck equipment, wherein the set of jars have successfully fired if the amount of time passed between initiation of the jarring operation and reception of the laser beam at the at least one laser receiver is within an acceptable range of time.

8. The method of claim 7,
wherein the set of jars are mechanically operated jars.

9. The method of claim 7,
wherein the set of jars are hydraulically operated jars.

10. The method of claim 7, further comprising:
installing, along the bottom hole assembly, one or more sensors, selected from the group consisting of vibration sensors, temperature sensors, and torque/tensile sensors, configured to diagnose downhole conditions.

11. The method of claim 10,
wherein the jarring data delivered to the computer processor further comprises data gathered from the sensors.

12. The method of claim 7,
wherein the acceptable range of time is determined from an experiment that tests the set of jars travel time under normal conditions.

13. The method of claim 7,
wherein the set of jars are single action jars and are comprised of a housing, a hammer head, and a piston.

14. The method of claim 13,
wherein the smart jarring system further comprises:
- installing the at least one laser source along the housing;
- emitting the laser beam from the at least one laser source; and
- installing the at least one laser receiver along the piston near the hammer head,
- wherein the at least one laser receiver receives the laser beam from the at least one laser source to detect if the jars have fired.

15. The method of claim 7,
wherein the set of jars are dual action jars and are comprised of a housing, a lower hammer head, an upper hammer head, and a piston.

16. The method of claim 15,
wherein the smart jarring system further comprises:
- installing the at least one laser source along the housing;
- emitting the laser beam from the at least one laser source; and
- installing the at least one laser receiver on an end of the piston,
- wherein the at least one laser receiver receives the laser beam from the at least one laser source to detect if the set of jars have fired and in which direction the set of jars have fired.

17. The method of claim 7,
wherein the corrective steps to free the stuck equipment comprise:
one or more actions selected from the group consisting of repeating the jarring operation, jarring in a different direction, cutting the stuck equipment at a free point, and running fishing tools.

* * * * *